April 11, 1967 LUCIEN-VICTOR GEWISS 3,313,080
SANDWICH STRUCTURE WITH NOVEL CORE ELEMENT
Filed Feb. 6, 1963 7 Sheets-Sheet 1

INVENTOR.
LUCIEN VICTOR GEWISS
BY
Lane, Aitken, Dunner & Ziems
ATTORNEYS

INVENTOR.
LUCIEN VICTOR GEWISS
BY
Lane, Aitken, Dunner & Ziems
ATTORNEYS

INVENTOR.
LUCIEN VICTOR GEWISS
BY
Lane, Aitken, Dunner & Ziems
ATTORNEYS

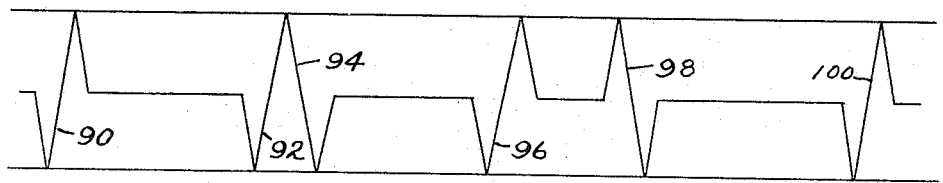
Fig. 15.
Fig. 16.
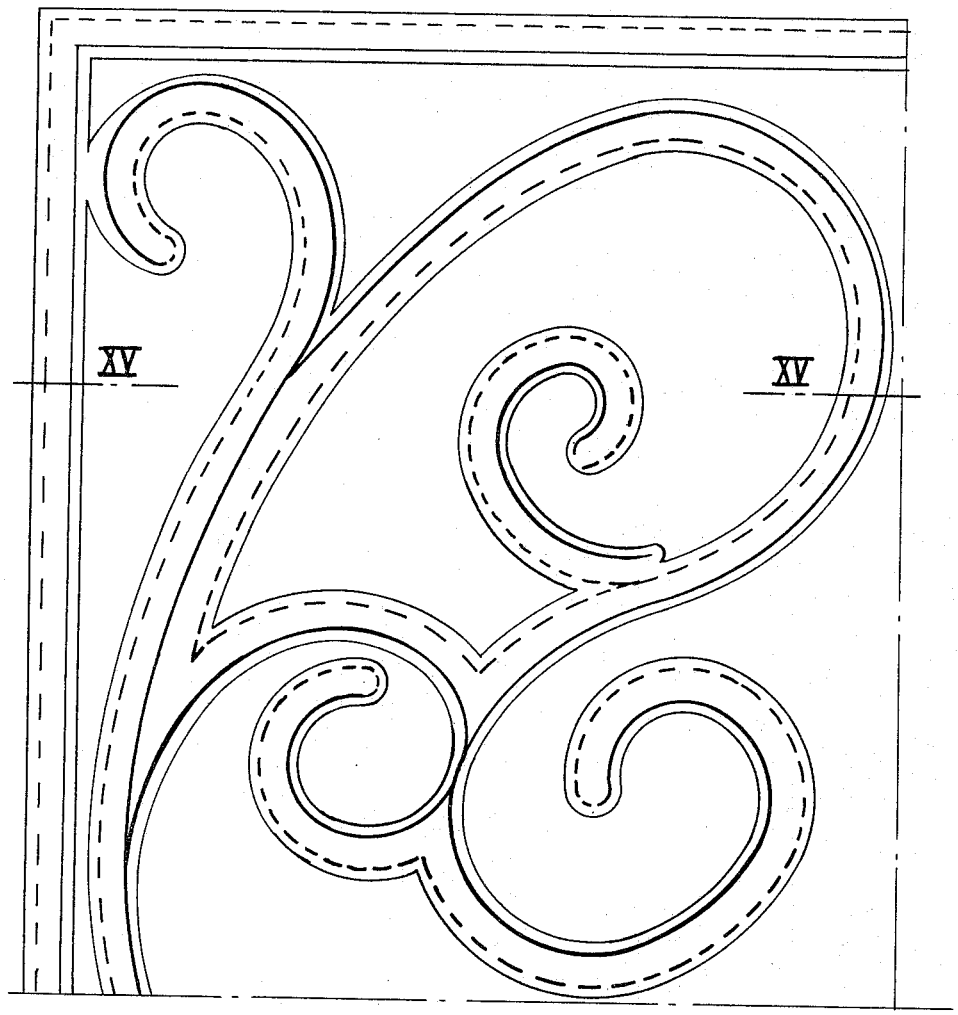
INVENTOR.
LUCIEN VICTOR GEWISS
BY
Lane, Aitken, Dunner & Ziems
ATTORNEYS April 11, 1967 LUCIEN-VICTOR GEWISS 3,313,080
SANDWICH STRUCTURE WITH NOVEL CORE ELEMENT
Filed Feb. 6, 1963 7 Sheets-Sheet 7
Fig.20. Fig.22.
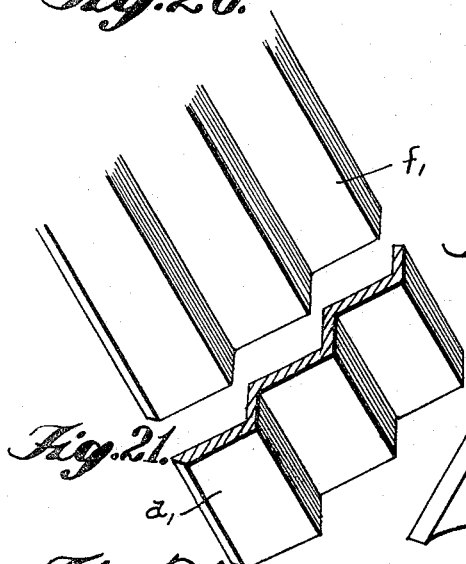
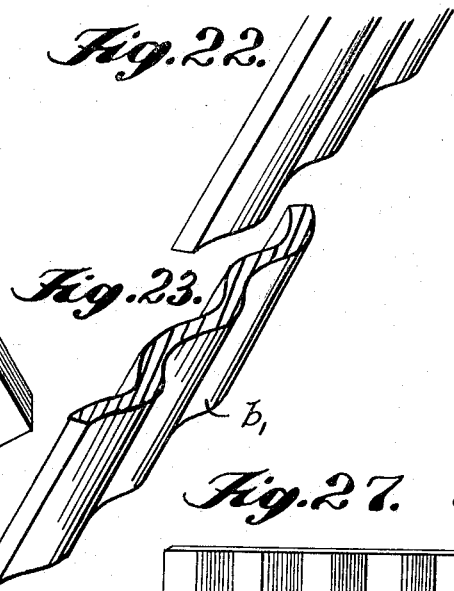
Fig.21. Fig.23.
Fig.24. Fig.25. Fig.27. Fig.28.
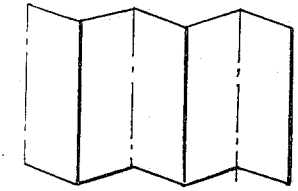  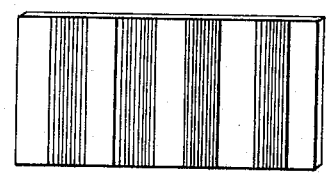 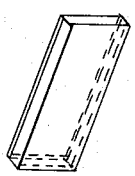
Fig.26. Fig.30. Fig.29.
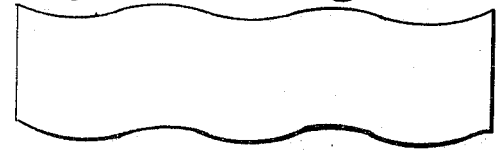 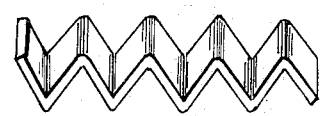
Fig.31.
Fig.32.
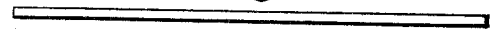
Fig.33. Fig.34.
 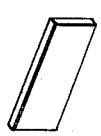
Fig.35.
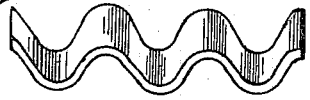
INVENTOR.
LUCIEN VICTOR GEWISS
BY
Lane, Aitken, Dunner & Ziems
ATTORNEYS 3,313,080
SANDWICH STRUCTURE WITH NOVEL
CORE ELEMENT
Lucien-Victor Gewiss, Ville-d'Avray, France, assignor to
Marc Wood Societe Anonyme Pour la Promotion, des
Echanges Techniques Internationaux, a company of
France
Filed Feb. 6, 1963, Ser. No. 256,656
Claims priority, application France, Feb. 7, 1962,
887,272, Patent 1,349,879
18 Claims. (Cl. 52—618)

The present invention relates to novel materials and processes for their production.

In applicant's copending application Ser. No. 514,171, filed June 9, 1955 (which is hereby incorporated by reference herein and which is based upon French patents 1,106,780 issued July 27, 1955; 66,807 issued Mar. 25, 1957; 67,078 issued May 13, 1957; and 68,479 issued Nov. 12, 1957), is described a novel type of material which is currently known under the name of "herringbone" structure and which, in its more general appearance, has the form of a structure folded from a flat sheet or band whose folds, located alternately in one and then another limiting plane, are zig-zag or corrugated lines. As pointed out in said copending application, such herringbone structures are comprised of ruled elementary surfaces which join each other along rigid lines having points at which they change direction and at each of which points border lines of four of said elementary surfaces converge, the sum of the angles formed on said surfaces between border lines at each of said points being equal to 360°. The sufaces of this novel structure may be planar or curved in configuration, or both but in all cases the structure meets the limitations set forth above. As is set forth in said copending application, one of the perculiar characteristics of the herringbone structure is that its surface is in actuality the materialization of a more or less complex geometric configuration which is developable along a plane (although the structure itself is not necessarily effectively developable).

The advantages of such herringbone structures are many and varied. For example, the fact that the herringbone structure is geometrically developable in form makes it possible to form such structure solely by means of folding operations performed on flexible (though not necessarily extensible) materials at extremely low cost. And due to the almost complete lack of deformation of the material as a result of such folding operation, the material may be formed through a much greater angle than would be the case with conventional forming techniques without significant danger of rupture of the material. This advantage would alone make the novel herringbone structures of applicant's copending application extremely significant and advantageous in and of itself.

But in addition to such advantage, the very nature of the herringbone structure is such as to make it extremely desirable and advantageous even when flexible or pliable materials are not used as the starting materials. For exmple, the load resistance of such herringbone structures is much greater than that of conventional corrugated structures due to the presence of the ruled surfaces which actually act as beams in resisting deformation in response to an applied force. Any load exerted against the enveloping surfaces of such structures will be applied at their ridge lines—to the exclusion of any elementary surfaces. Such load will therefore be supported by the material of the sides or flanks of the structure along straight resistance lines which necessarily connect the various points of one ridge line to the various corresponding points of the other ridge line in the plane opposite the first ridge. Under such circumstances, when a load is applied from one ridge line to the other, the sheets of herringbone material are compressed in the plane of their mean surface. The material therefore resists the load with the maximum resistance of which it is capable, i.e., the resistance in compression of the plane on itself.

Because of such desirable characteristics, the herringbone structures are extremely useful in a variety of applications, including sandwich structures, the manufacture of furniture and opaque, transparent or translucent doors, partitions, false ceilings and other building materials, filters, heat exchangers, etc., the use of such material in filters and heat exchangers being particularly desirable, for example, due to the possession by such material of the optimum combination of strength and great surface area, not to mention the minimum expense at which the filters and heat exchangers may be fabricated.

Because of the great variety of applications of the herringbone structure, such structure may be fabricated by methods other than the bending or folding methods to which said copending application S.N. 514,171 is primarily (though not exclusively) directed. Copending U.S. application Ser. No. 215,519, filed on Aug. 8, 1962 (which is hereby incorporated by reference and which corresponds to French application Ser. No. P.V. 870,498 filed on Aug. 9, 1961) describes such methods in geart detail.

Practical experience having fully confirmed the first tests with respect to the qualities of such developable herringbone structures, it was felt desirable to seek new forms of structures which could offer properties similar in important respects to said developable herringbone shapes, more particularly but not exclusively for the manufacture of sandwich material cores, in which such structures are bonded to two skins sandwiched about them. As a result of this research, new structures were indeed discovered which make it possible to obtain this result and which, in their most general embodiment, can be defined as being geometric configurations the surface of which is not developable onto a plane and which is formed of a series of segments which may or may not be planar but which are connected together to form undulations whose peaks form ridges, one geometric limiting surface on each side of said surface being in contact only with said ridges and all of said segments in contact with said geometric limiting surfaces along two ridges being capable of being generated by a straight line intersecting said two ridges. The ridges generally are non-rectilinear lines but may, in some cases, be reduced to points.

With the foregoing as a basis, the present invention has as its principal object the provision of novel articles containing a structure conforming to the above definition.

It is another major object of the preesnt invention to provide sandwich structures containing a core whose geometric configuration conforms to the foregoing definition.

It is a further object of the present invention to provide methods of fabricating the novel articles and sandwich structures described above.

It is still another object of the present invention to provide novel materials which are useful in fabricating the novel articles and sandwich structures described above.

It is another object of the present invention to provide a shaped article formed of a material whose surface is comprised of segments connected together by ridge lines so that there exists a geometric limiting surface on each side of said structure which is in contact only with said surface along ridge lines and so that any segment in contact with said surface along two ridge lines is capable of being generated by a straight line intersecting said two ridge lines.

It is still a further object of the present invention to provide a shaped article formed of a material having a surface which is nondevelopable onto a plane and which is formed of a series of segments which are connected together to form undulations, each undulation being formed of two segments in substantially V-shaped relation to one another with the vertices of said V's constituting ridges, one geometric limiting surface on each side of said surface being in contact only with said ridges and all of said segments in contact with said geometric limiting surfaces along two ridges being capable of being generated by a straight line intersecting said two ridges.

These and further objects and advantages of the present invention will become more apparent upon reference to the ensuing description and claims and the several drawings appended hereto.

In practice, the structures of the present invention will be made of a material which is relatively thin with respect to its surface area, viz., which is a sheet or which is sheet-like. In view of the fact that such structures are not developable onto a plane, it is not possible in principle to obtain them by folding a pliable sheet as in the case of the developable herringbone structures previously mentioned. On the other hand, processes which are well suited for the production of the non-developable structures of the present invention can be, as a function of the nature of the materials used, most of those which have been described in said copending U.S. application Ser. No. 215,591.

These various processes will be set forth below. But first, so that the present invention will be better understood, there will be described, with reference to the annexed drawings (which are given as non-restrictive examples), certain of the most characteristic shapes which can be assumed by non-developable structures according to the invention. In the drawings:

FIGS. 15 and 16 represent respectively a cross-sectional and a top plan view of a decorative structure according to the invention, FIGURE 15 being a section through line XV—XV of FIGURE 16;

FIGS. 20 and 21 represent respectively, in perspective, a folded thick sheet and a segment formed from such sheet;

FIGS. 22 and 23 represent respectively, in perspective, a thick corrugated sheet and a segment formed from such sheet;

FIGS. 24, 25 and 26 represent respectively plan, profile and elevational views of a band of thick material cut to a profile that permits the production of a folded segment;

FIGS. 27, 28 and 29 represent respectively plan, profile and elevational views of the band mentioned above which has assumed after folding the form of a folded segment;

FIGS. 30, 31 and 32 represent respectively a plan, profile and elevational view of a band of thin material cut to a profile that permits the production of a corrugated segment; and FIGS. 33, 34 and 35 represent respectively a plan, profile and elevational view of the band mentioned above which has assumed after corrugation the form of a corrugated segment.

[Note.—When used in this specification and claims, the term "geometric limiting surface" is to be construed to define an imaginary surface (unless otherwise specified) which has a regular and predetermined geometric shape, as distinguished from a random shape which does not conform to any particular and defined geometric rule.]

Figure 1:
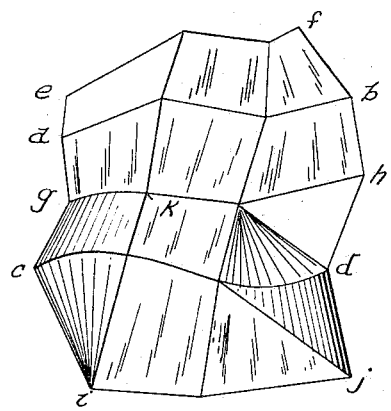
FIG. 1 represents in perspective a structure complying with the general definition of the invention.

The structure represented in FIG. 1 complies with the general definition previously set forth of non-developable structures according to the invention. It is indeed the embodiment of a non-developable geometric configuration which comprises a series of four elemental segments consisting of flat, curved or crooked surfaces, but all of them ruled surfaces. The non-rectilinear ridge lines along which the segments alternately join each other are, for one of the two main geometric limiting surfaces, the lines *ab* and *cd* and for the other, lines *ef*, *gh* and *ij*.

The structure could be developable if the angles surrounding the various points of convergence (such as *k*) of the ridge lines totalled 360°. Since this is not the case (in a non-developable structure, the total will always be less than 360°), the surface is not developable.

Figure 2:
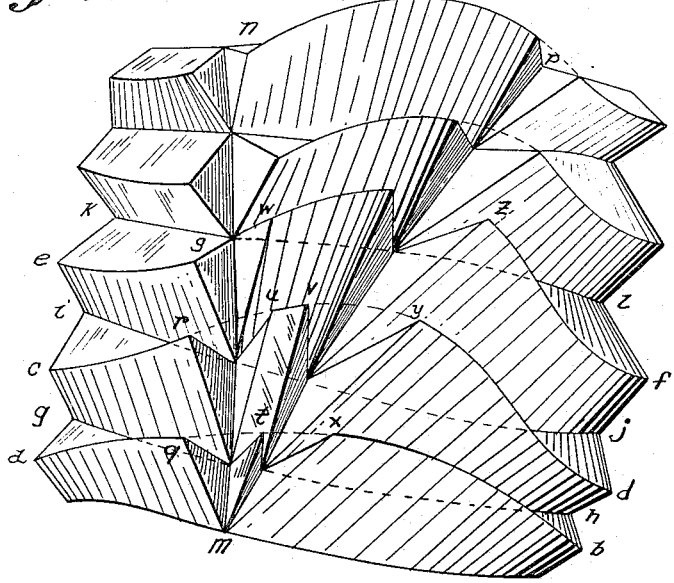
FIG. 2 represents in perspective a structure within the framework of the present invention but consisting of two series of elemental segments.

The structure represented by FIG. 2 also complies with the general definition. It comprises two series of undulated ruled surface segments, the first series bounded by the ridge lines *ab*, *cd*, *ef*, etc. on one face and by the ridge lines *gh*, *ij*, *kl*, etc. on the other face; and the second series bounded by the ridge lines *mn* and *mp* on one face and by the points *q*, *r*, *s*, etc., *t*, *u*, *v*, etc., and *x*, *y*, *z*, etc. on the other face. From all appearances, this structure is not developable due to the very existence of the double series of segments it comprises.

Figure 3:
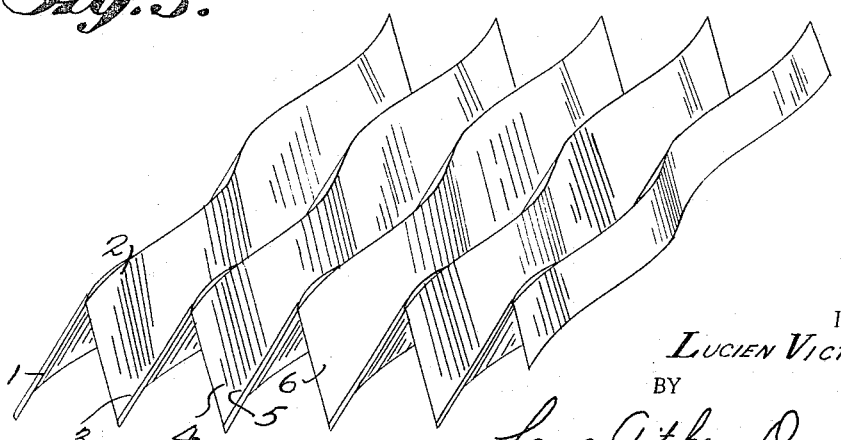
FIG. 3 represents in perspective a structure according to the present invention with undulated elemental segments.

The structure with undulated segments in FIG. 3 resembles in appearance a developable structure. Actually, it is not one despite the fact that its two main geometric limiting surfaces, which comprise all of the ridge lines along their entire length, are flat and parallel. This is due to the fact that the ruled surface segments of which it is constituted are of unequal height and length, the segments of the odd rows 1, 3, 5, etc. being a little higher and a little narrower than the segments of the even rows 2, 4, 6, etc., which results in angles at the various points of the undulated ridges whose sum is less than 360°.

Figure 4:
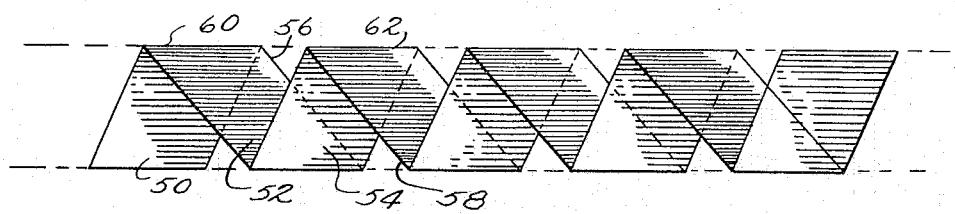
FIGS. 4 and 5 represent respectively, in profile and in perspective, a structure with elemental segments formed of parallelograms.
Figure 5:
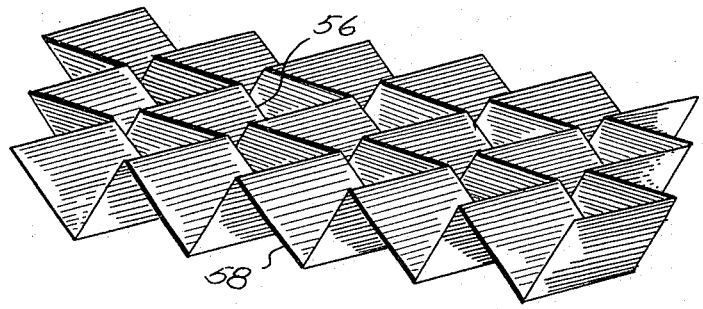

The structure with parallelogram-shaped segments represented by FIGS. 4 and 5 is in exactly the same category as the preceding one. It differs from a developable structure with flat parallel faces only because the adjacent segments of each pair of segments are of slightly different height and width. This peculiarity results in angles at the summits of the ridegs whose sum is less than 360°.

As will be seen in FIG. 4, one geometric limiting surface (in this case such geometric limiting surface being illustrated by a broken line representing a planar surface) can be formed on each side of the non-developable structure, said geometric limiting surfaces being in contact with said structure only at its points of contact with the ridges of the latter. As will also be seen in this figure, each of the segments (i.e., 50, 52, 54), which in this case are planar, which are in contact with such limiting surfaces along two ridges are capable of being generated by a straight line intersecting both of said two ridges. Still further, FIGURES 4 and 5 illustrate that those edges (ie., 56, 58) of the segments which are not in contact with the geometric limiting surfaces (as are the ridges, such as 60, 62, etc.) are straight lines. All of these features are as well applicable to the other non-developable structures of the present invention.

Figure 6:
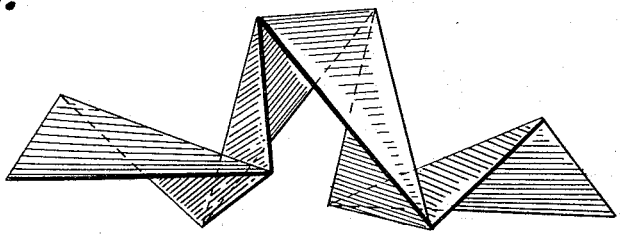
FIGS. 6 and 7 represent respectively, in profile and in perspective, a structure according to the present invention with elemental segments formed of triangles.
Figure 7:
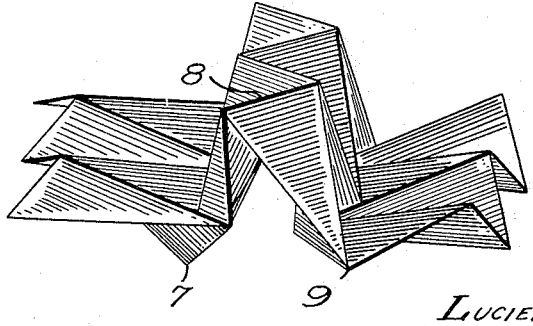

The structure with triangular segments represented by FIGS. 6 and 7 also has a shape which calls to mind developable configurations. It is not one for reasons identical to those set forth above, the sum of the angles at all points along the ridge lines 7, 8 and 9 being less than 360°.

Figure 8:
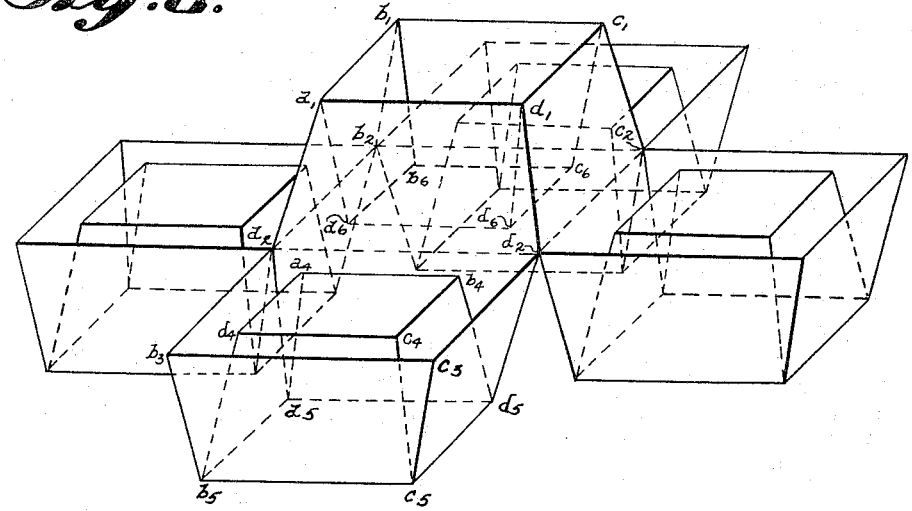
FIG. 8 represents in perspective a structure according to the present invention consisting exclusively of double hollow truncated pyramids with square bases.

FIG. 8 represents five elements of a structure composed of truncated pyramids with square bases. This figure was intentionally limited to these five constituent elements of the structure in question so that they would clearly appear.

In the central part a hollow truncated pyramid can be seen whose bases are: $a_1$, $b_1$, $c_1$, $d_1$ in the case of the smaller base and $a_2$, $b_2$, $c_2$, $d_2$ in the case of the larger base. This hollow truncated pyramid is surrounded by four other truncated pyramids which are identical but inverted. The four side faces of the central truncated pyramid are therefore extended in their planes by the inside face of each of the four peripheral truncated pyramids. Thus, face $a_1$, $d_1$, $d_2$, $a_2$ is extended in its own plane by face $a_2$, $d_2$, $d_5$, $a_5$. The result is that between ridge line $a_1d_1$ and ridge line $a_5d_5$ a segment $a_1d_1d_5a_5$ with a planar surface is located. The same is true of the other three faces of the central truncated pyramid.

Under these circumstances, it will be understood that the complete structure which is formed by a collection of adjacent truncated pyramids connected in a continuous manner all along the ridge lines of their largest square cross-section appear in the form of a sort of cake of honeycomb whoses cells would be not hexagonal but square.

In order to visualize the continuity of the surface, it should also be borne in mind that each of the square opening such as $a_1b_1c_1d_1$, $a_2b_2c_2d_2$ itself contains a truncated pyramid such as $a_1b_1c_1d_1$, $a_6b_6c_6d_6$ whose closed face $a_6b_6c_6d_6$ is a plane.

The whole thus constituted is indeed a structure according to the invention since:

(1) the whole configuration is not developable (less than 360° at the angles);

(2) the main geometric limiting surfaces contain only ridge lines;

(3) the ridge lines of one face are joined to the ridge lines of the other face by ruled surfaces which are moreover planes in this case.

It will also be noted that the surface of the geometric configuration is uninterrupted or continuous.

Figure 9:
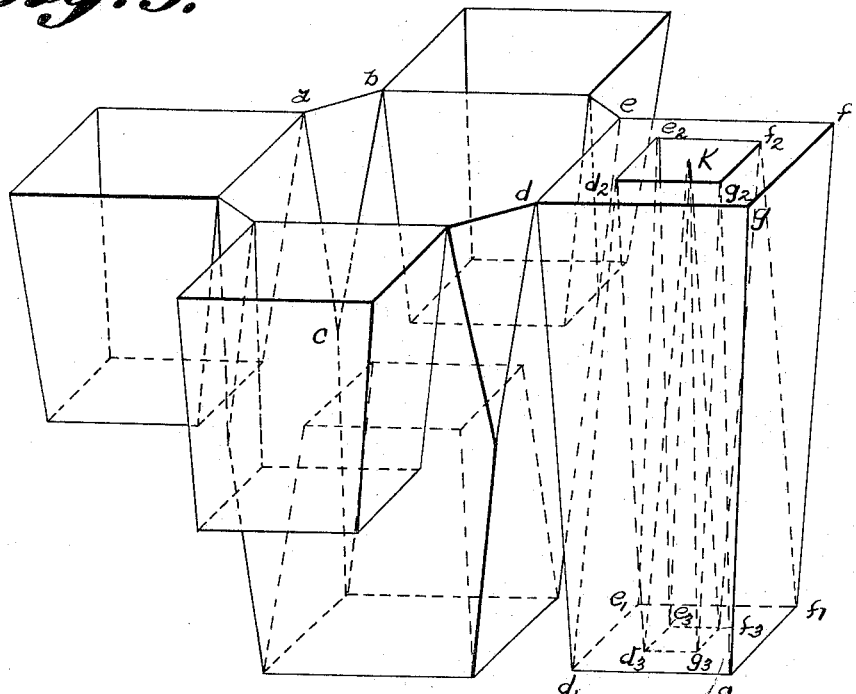
FIG. 9 represents in perspective a structure according to the present invention consisting exclusively of double hollow truncated pyramids also with square bases but connected together.

FIG. 9 represents a taller structure, which is quite similar to that of FIGURE 8, consisting also of truncated pyramids with square bases. In this case, however, the four angles of the central truncated pyramid have been truncated by segments such as $a$, $b$, $c$. In this manner, the ridge lines are no longer isolated into squares on each face, but are connected together in the form of an octagon.

In this same figure a means has been shown of increasing the number of segments and ridge lines by multiplying the number of truncated pyramids located inside each other. In the right hand part of this FIGURE 3, distinct truncated pyramids can be seen which are connected together and inserted inside each other. These are: $defg-d_1e_1f_1g_1$, then $d_1e_1f_1g_1-d_2e_2f_2g_2$, and $d_2e_2f_2g_2-d_3e_3f_3g_3$ and finally a complete pyramid $Kd_3e_3f_3g_3$.

Figure 10:
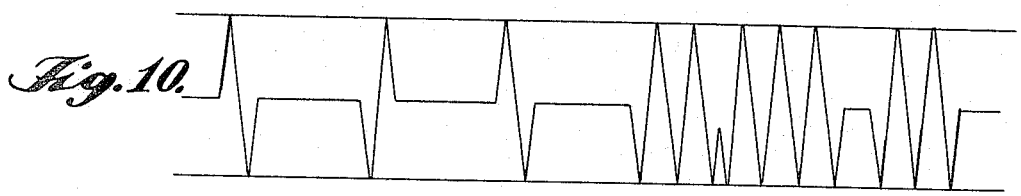
FIGS. 10 and 11 represent respectively a cross-sectional and a top plan view of a structure of the type shown in FIGURE 9, FIGURE 10 being a section along line X—X of FIGURE 11.
Figure 11:
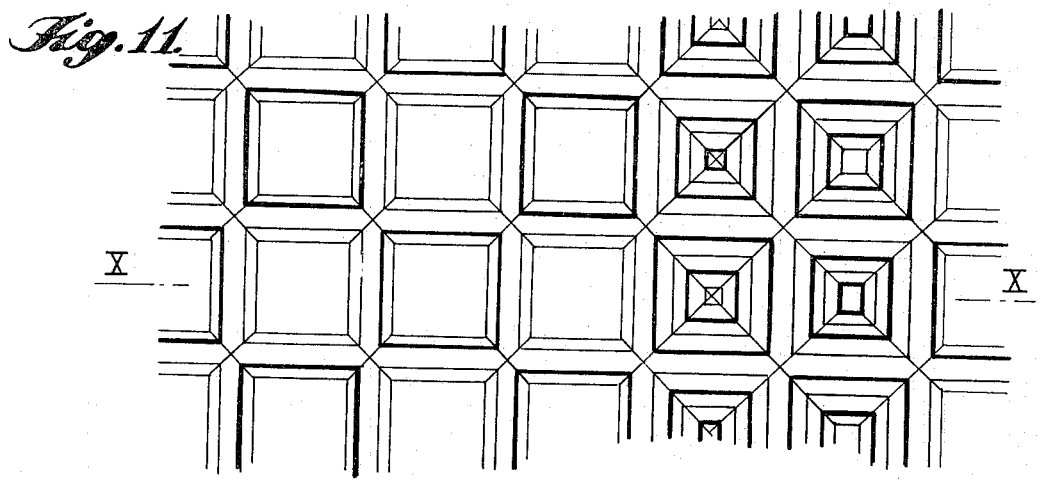

FIGS. 10 and 11 represent a structure of the type shown in FIG. 9.

Figure 12:
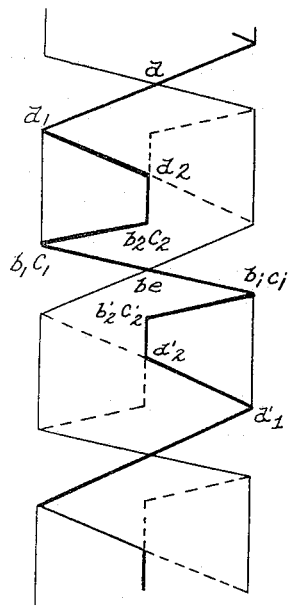
FIGS. 12 and 13 represent respectively a cross-sectional and a top plan view of a structure according to the present invention consisting of double hollow truncated pyramids with triangular bases, FIGURE 12 being a section along line XII—XII of FIGURE 13.
Figure 13:
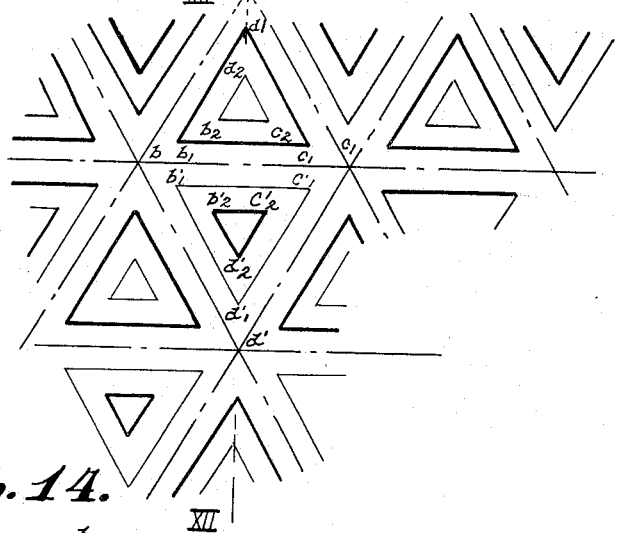
Figure 14:
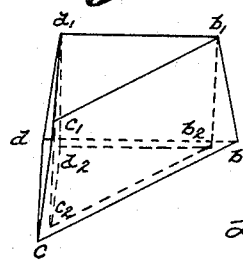
FIG. 14 represents in perspective one of the hollow truncated pyramids with a triangular base which constitute the structure of FIGURES 12 and 13.

FIGS. 12 and 13 represent a recessed structure of the same type as the preceding one but whose pyramids have triangular bases. FIG. 14 represents in perspective one of the triangular truncated pyramids constituting the basic element of this structure.

In referring to FIGS. 12 and 13, it will be seen that truncated pyramid $abc$, $a_1b_1c_1$, $a_2b_2c_2$ is exactly the truncated pyramid of the same designation represented in perspective in FIG. 14. The same is true of the inverted truncated pyramid $a'bc$, $a'_1b'_1c'_1$, $a'_2b'_2c'_2$. For the same reasons as those indicated above for truncated pyramids with square bases, this structure of truncated pyramids with triangular bases conforms to the invention.

Naturally, nothing would prevent adopting, as the basis of a structure, truncated pyramids of hexagonal, polygonal or even circular cross-section which would be assembled as explained above. Thus would be obtained various kinds of honeycomb-type cakes with cells closed in the middle having hexagonal, polygonal or circular cross-sections. In general, all combinations which are found in the most diverse tile floorings can be used as cross-sections of the truncated pyramids which serve as the basis for constituting a structure in accordance with the invention.

A form susceptible of being used for a decorative purpose, provided the outside skins of the sandwich material are made of transparent material, is represented by way of example in FIGS. 15 and 16. In this case, the ridge lines of each face of the structure follow any desired contour without, however, ceasing to be connected together by ruled surface segments.

The heavy lines in FIG. 16 are ridges which are located in the plane of the upper face; those which are dashed are located in the plane of the lower face; the fine lines bound the plane surfaces which connect the segments outside of the two main geometric limiting surfaces.

Naturally, it is possible to vary infinitely the designs of the type represented.

Aside from FIGURES 1 and 2, the various figures set forth in the drawings shown structures having flat, parallel geometric limiting surfaces. It is also within the framework of the present invention, however, to provide structures having other than flat, parallel geometric limiting surfaces. For example, structures whose surfaces are formed of truncated pyramids (in the nature of those discussed above) of any cross-section and of varying heights may be provided within the scope of the invention and could have either non-parallel planar limiting surfaces, or one planar and one non-planar or even two non-planar limiting surfaces. Generally speaking, however, the geometric limiting surfaces of the structures of the present invention are simple geometric shapes. More specifically, such limiting surfaces are those having a regular and predetermined geometric shape, as distinguished from a random shape which does not conform to any particular and defined geometric rule. The most common geometric limiting surface which will define the non-developable structures of the invention are, of course, planar. Other geometric limiting surfaces which are also particularly worthy of mention are cylindrical surfaces and second degree surfaces, the latter being illustrated by spheres, cones, hyperboloids and paraboloids.

As was stated previously, the processes which can be used to make structures according to the present invention are, in principle, those which have been described, as a function of the materials used, in said copending application Ser. No. 215,591. These processes are set forth below:

I. Pliable materials in sheet form, whose properties of stretching, in the natural state or under the influence of an appropriate temporary softening process, are such that these materials can be made to assume the desired shape, either without previous preparation or following a first, more or less accentuated simple folding, which outlines the shape.

Sheet materials of this type are:

(1) Metals which can assume shapes such as those represented in the drawings by cold or hot pressing, in one or more passes, between appropriate dies.

(2) All sorts of plastic materials such as glass, certain ceramic materials, gums, etc., which can soften temporarily as a result of an appropriate treatment, such as heat, partial dissolution or humidification. These various sheet materials thus softened can be advantageously made into the form of structures according to the invention by simple pressing between appropriate dies, or simpler yet, by collapsing them into an appropriate mold under the effect of vacuum or of air or steam pressure.

(3) Certain papers, felts, cardboards, cloths, etc., after softening, if required, by humidification for example. In this case, the manufacturing processes are of the same nature as the preceding ones. The possibly insufficient stretching properties of the material can be compensated for by outlining the shape so as to permit the introduction of the sheet material into a mold, as in the preceding case, but by using a greater area of material.

II. Sheet materials, which rendered temporarily very ductile by a suitable treatment, lend themselves in this state to substantial stretching in all directions without rupture.

III. Pliable or non-pliable materials which are initially in the form of sheets or of folded or undulated plates.

Materials which can be in this state include metals, all sorts of plastic materials, products derived from cements, cardboards, papers, composition materials, etc. They include, for example, corrugated sheet metal, corrugated paperboard, plates of material commercially known under the names "Isorel" and "Everite," plywood, laminated plastics, etc.

Structures in accordance with the invention made from these preformed materials can be obtained by cutting out the segments and assembling them by welding or cementing. This process can be applied, in particular, to the manufacture of structures such, for example, as those represented in FIGS. 3–5.

IV. Thin pliable materials available in sheets only in the form of strips which are narrow with respect to the height of the segments of the structure to be made.

This includes practically all pliable sheet materials when they are used to make structures of large dimensions: papers, felts, cardboards, thin metals, plastic materials, wire cloth, etc. In this case it is generally not possible to make use of the conventional forming processes because these would first necessitate the creation, by welding, cementing or any other joining means, of large sheets having an exceptionally cumbersome width and the use of machines of unacceptable dimension and cost.

The process to be applied in this case comprises the cutting of the sheets into strips having exactly the profile of the various straightened segments of the structure to be made, folding or curving the segments to the shape they must have in the structure, then in assembling them, at the desired angle, by the appropriate processes, along the ridge lines along which their edges are joined. The assembling can be performed, depending on the materials used, by welding in the case of metals, welding or cementing in the case of plastic materials, sewing in the case of cloths, etc.

V. Thick sheet materials or plate materials which are not pliable enough, because of their nature or by reason of their thickness, to lend themselves to formation by one of the processes mentioned in I and II, but which can nevertheless be cut into strips and, in this form, folded or curved.

Sheet materials of this type include thick sheet metal, all sorts of plastic materials, composition materials, sandwich materials, corrugated paperboards, thick cardboards, plywood, wood, etc.

In this case, the practical impossibility of forming these materials by conventional pressing or die-forming comes from their inadequate pliability due, in the case of metals and plastics, to the fact that they are too thick and, in the case of composition products, to their more or less indeformable nature. The process to be applied therefore consists of cutting the material into strips, folding or curving the strips and assembling them as in the preceding case.

VI. Materials which it is necessary or simply advantageous to form other than by first passing through the sheet state because, by their nature or under the action of an appropriate chemical or physical agent, they lend themselves to assuming the shape of a mold.

Materials of this type are:

(1) Metals which, when cast, stamped or die-formed assume directly the shape of a mold.

(2) Materials such as waxes, resins, etc., which can be molded as in the above cases.

(3) Plastic materials of all types which assume the most complex shapes by hot molding, both under pressure and without pressure (injection, intrusion, etc.).

(4) Ceramic products of all types which, in the paste state, assume the shape of the molds in which they set.

(5) Limes, plasters and cements as well as materials of all types which, in granular form, are mixed with an appropriate binder such as cement, glue, sodium silicate, plastic materials, etc., and are susceptible, after mixing, of setting while in a mold.

(6) Products derived from latex which, by molding under pressure at the vulcanizing temperature, make it possible to obtain molded rubber or ebonite parts.

(7) Powdered or granular metals or other products which, when molded under pressure between appropriate forms, can be solidified into such shapes by sintering at suitable temperature.

Because of the fact that the configurations according to the invention lend themselves remarkably well to removal from molds since they are essentially composed of V-shaped recesses, it is certain indeed that all the conventional manufacturing processes which have just been cited can be applied to produce the new materials that are the subject of the invention, without abnormal difficulties other than those which might result from the material.

The techniques of forming the non-developable structures of the present invention according to the descriptions set forth in Groups I and VI need no further explanation for their understanding. That set forth in Group II is described in detail in said copending application Ser. No. 215,591 and also need not be further described herein. In the following paragraphs, however, the manufacturing techniques of Groups III, IV and V will be briefly discussed. Since these techniques utilize individual and separate segments in the course of the fabrication involved, structures made thereby, as illustrated in FIGURES 17–19, will be described first.

Figure 17:
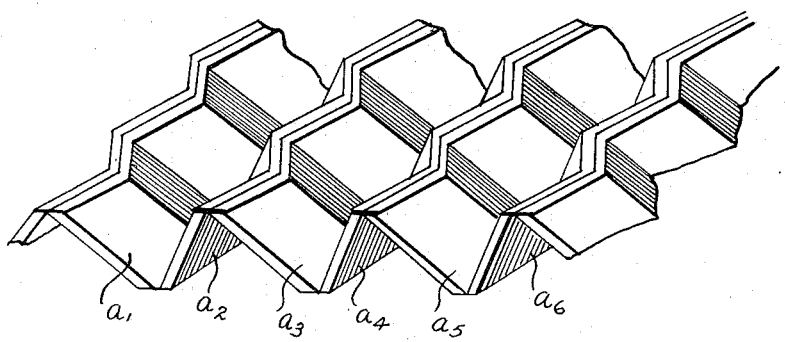
FIG. 17 represents in perspective view a non-developable structure according to the present invention constituted by individual segments, assembled together.
Figure 18:
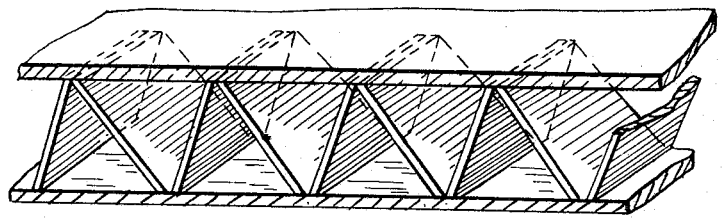
FIGS. 18 and 19 represent in section two sandwich structures with a non-developable core according to the present invention, the former with joined separate segments and the latter with unjoined separate segments.
Figure 19:
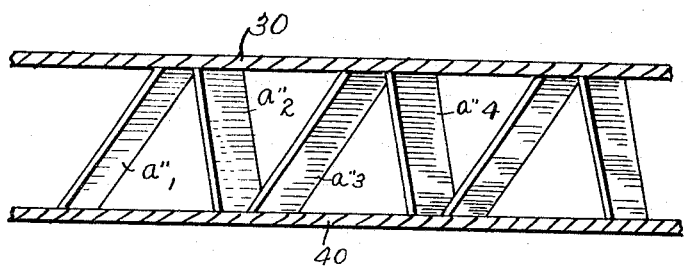

FIGURES 17–19 represent structures which may be fabricated by the techniques of FIGURES 20–35.

In the structure of FIGURE 17, the material is constituted by thick broken segments $a_1, a_2, a_3, a_4$, etc., which are respectively truncated segments of a non-developable configuration, these truncated segments having ruled surfaces and being assembled together along their contact lines by soldering, gluing or other conventional means. Successive segments $a_1, a_2, a_3$, etc. are of unequal height though, in the embodiment shown, alternate segments (viz., $a_1, a_3, a_5$; $a_2, a_4, a_6$) are of equal height.

FIGURE 18 represents a sandwich structure whose core material is that illustrated in FIGURE 17. As is apparent, the two outer skins are bonded to and have contact only with the ridges formed by the joining of the various segments of the core. [Note.—A continuously formed core, such as shown in FIGURES 4 and 5, could obviously be substituted for the core of FIGURE 18 within the framework of the present invention.]

In the variant represented in FIG. 19, the sandwich panel comprises two plates 30 and 40 between which are interposed the segments $a''_1$, $a''_2$, $a''_3$, $a''_4$, etc., of varying heights, truncated between parallel sections. These segments are fixed in place like those of the preceding panel, but not jointly, thus forming a structure with broken segments.

The particular method of preparation of the segments which are used to form the structures of FIGS. 17–19 depends upon the nature of the material to be used in their fabrication. When the material to be used is available in the form of folded corrugated sheets having as a cross-section the cross-section of the segments to be provided (viz., Group III previously enumerated), the segments may be prepared according to the present invention by cutting off segment sections from the corrugated sheet at a suitable height and at a suitable angle with respect to the length of the sheet.

Such a technique is illustrated in FIGS. 20–23, FIGS. 20 and 21 illustrating a folded sheet having planar segments and FIGS. 22 and 23 illustrating a corrugated sheet with a sinuous cross-section. As will be apparent from FIGS. 20 and 21, for example, a section $a_1$ is cut off the folded sheet $f_1$ at a point such that the height of section $a_1$ will correspond to the height of segment desired in the final product, i.e., corresponding to the height of segment $a_1$ in the non-developable structure of FIG. 17. (As will be apparent, the section $b_1$ in FIG. 23 represents a sinuous segment $b_1$ which would be required for a structure similar to that of FIG. 17 but having sinuous segments.) When a plurality of such segments have been cut, they are then arranged together in the manner shown, for example, in FIGS. 17 and 18 and fixed in place by a conventional bonding operation.

An important and critical aspect of the method just described in connection with FIGS. 20–23 is that each segment cut off the elongated folded or corrugated sheet must be cut off at an angle to a plane parallel to the sheet, i.e., at an angle to a plane passing through the ridge lines of said sheet, while the sheet is in its folded or corrugated condition. If the cutting angle is normal to the plane of the sheet or if the sheet is cut while in planar form (i.e., before corrugating or folding), the segments cut from the sheet will not mate with one another when placed in angular relationship as in FIG. 17.

Another important aspect of the method described in connection with FIGS. 20–23 is that the elemental segments must be cut so that, when assembled in the finished structure, the structure will be non-developable onto a plane. This may be accomplished by cutting the segments so they have varying heights, as was the case with the segments used to form the non-developable structure of FIGS. 17 and 18.

The cutting technique utilized to form the segments in accordance with the technique of Group III will vary, of course, depending upon the material being cut, a high speed abrasive cutting wheel being an example of a means which may be employed for cutting the materials in question.

When the material to be used is one of those described previously in Groups IV and V, i.e., where (1) the material, though malleable, is not available in the form of elongated sheets but only in the form of bands whose height (or length) is not sufficient to permit it to be folded into a full non-developable structure, or (2) where the material is in the form of thick sheets or plates which are not pliable enough, due either to their very nature or because of their great thickness, to be folded into a complete non-developable pattern but which, nevertheless, can be cut into narrow bands and be folded or fashioned in that form, the method illustrated in FIGS. 24–35 may be employed to form the desired structure.

In accordance with this method (for this description, the folded species of FIGS. 24–29 will be referred to; obviously, the same considerations apply to the corrugated or sinuous species of FIGS. 30–35), the flat (unfolded) material is first cut into a form corresponding to the form which one segment of the completed non-developable structure would have if flattened (viz., developed) completely, as shown in FIGS. 24–26. This flat segment is then folded along the broken lines shown in FIG. 24 (in the species of FIGS. 30–35, a continuous sine-wave bend, rather than a plurality of single folds, will be formed) to form the completed segments of FIGS. 27–29. A plurality of flanks made in this manner are then bonded into a unitary structure as previously described in connection with FIG. 17.

Again, the elemental segments should be formed so that, when assembled in the finished structure, such structure will be non-developable onto a plane.

In the preceding portions of this specification it has been mentioned that the novel structures of the present invention should be so formed that the geometric limiting surface on each side of the non-developable core material is in contact only with the ridges of the latter. At least substantial compliance with this limitation is important when the ridge which is in contact with the limiting surface is to serve in a load-bearing capacity (i.e., as is the case when the geometric limiting surface is a sandwich skin and the sandwich is to serve as a structural member which must withstand compressive forces), since any portion of the ruled segment other than the part forming a ridge which is in contact with the limiting surface will not serve to resist the load and the efficiency of the structure will be reduced to that extent.

As will be apparent, the non-developable structures of the invention may possess both load-bearing properties and non-load-bearing properties (i.e., decorative properties), as could be the case, for example, in the embodiment of FIGS. 15 and 16. In such case, only the segments which are to serve as load-bearing segments (i.e., segments 90, 92, 94, 96, 98 and 100 in FIGURE 15) need meet the requirements that they be capable of being generated by a straight line passing through their two ridges which are located on the two geometric limiting surfaces.

The structures of the present invention, while lacking the obvious advantage of the developable structures of said copending application Ser No. 514,171 in that the latter may be fabricated by simple folding techniques (as has been discussed in greater detail at the beginning of this specification), are nevertheless quite valuable not only for decorative purposes but as structural materials such as the fabrication of panels, partitions, sandwich structures, etc. The latter function is effectuated by the non-developable structures of the present invention particularly when they are fabricated in an undeformable condition, since in such condition they provide great resistance to compressive forces.

When used in the claims, the phrase "non-developable chevron structure" shall be construed to define a structure formed of a material having a surface which is non-developable onto a plane; said surface being formed of a series of segments which are connected together to form undulations; each undulation being formed of two segments in substantially V-shaped relation to one another with the vertices of said V's constituting ridges; one geometric limiting surface on each side of said surface being in contact only with said ridges; and all of said segments in contact with said geometric limiting surfaces along two ridges being capable of being generated by a straight line intersecting said two ridges.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A sandwich structure comprising a core element and two outer skins sandwiched about and bonded to said core element; the surface of said core element being non-developable onto a plane and being constituted by a series of ruled surface segments which are angularly attached to one another to form undulations with each undulation being formed of two ruled surface segments in substantially V-shaped relation to one another; the vertex of each of said V's forming a ridge on said core element; said outer skins comprising geometric limiting surfaces for said core element and being in contact therewith substantially only at the points of contact of said ridges with said skins; and all of said segments in contact with said outer skins along two ridges being capable of being generated by a straight line intersecting said two ridges.

2. A sandwich structure as defined in claim 1 wherein each of said ruled surface segments is undulated in a direction other than that of the undulations formed by the juxtaposition of said segments.

3. A sandwich structure as defined in claim 2 wherein the undulations of each of said ruled surface segments are substantially sinuous.

4. A sandwich structure as defined in claim 1 wherein said ruled surface segments are planar.

5. A sandwich structure as defined in claim 1 wherein at least some of said ridges are non-rectilinear.

6. A shaped article as defined in claim 1 wherein the surface of said core element is formed into a plurality of closed geometric forms, borders of which are formed by said ridges.

7. A shaped article as defined in claim 6 wherein said closed geometric forms are polygons.

8. A shaped article as defined in claim 6 wherein said closed geometric forms are elements of hollow truncated pyramids.

9. A shaped article as defined in claim 1 wherein the material of said core element is substantially undeformable without rupture of said material.

10. A shaped structure formed of a material which is sheet-like and whose surface is comprised of segments connected together by ridge lines so that there exists a geometric limiting surface on each side of said structure which is in contact substantially only along ridge lines and so that any segment in contact with said limiting surfaces along two ridge lines is capable of being generated by a straight line intersecting said two ridge lines, said shaped structure being non-developable onto a plane; said shaped structure being sandwiched between two skins to form a sandwich structure; said skins being in contact with said shaped structure substantially only at the ridge lines of the latter and having the shape of said geometric limiting surface, 11. A shaped structure as defined in claim 10 wherein said geometric limiting surface is a plane.

12. A shaped structure as defined in claim 10 wherein said geometric limiting surface is a second degree surface.

13. A shaped structure as defined in claim 10 wherein the material of said shaped structure is substantially undeformable without rupture of said material.

14. A structure with load-bearing capacity formed of a material which is sheet-like and which is shaped to form a succession of segments; all of said segments other than those adapted to have properties other than load-bearing properties having a shape capable of being generated by a straight line; each edge of said segments intersected by said straight line being located on one of two geometric limiting surfaces; the other edges of said segments being straight lines said structure being non-developable onto a plane; said structure being sandwiched between two skins to form a sandwich structure; said skins being the materialization of said geometric limiting surfaces; said skins having contact substantially only with said segment edges intersected by said straight line.

15. A structure as defined in claim 14 wherein said structure is non-developable onto a plane and wherein said two geometric limiting surfaces have contact substantially only with said segment edges intersected by said straight line.

16. A structure as defined in claim 14 wherein at least some of said segments are other than load-bearing.

17. A sandwich structure comprising a core and two outer skins sandwiched about and bonded to said core; said core being in the form of a non-developable chevron structure having a plurality of undulations in a first direction, each undulation being formed by two segments in substantially V-shaped relation to one another and which are themselves undulated in a second direction substantially normal to said first direction, the undulations of each segment in said second direction being reversed with respect to the corresponding undulations of its next adjacent segment in said first direction, each of said segments being individually formed but being bonded to its next adjacent segment in said first direction.

18. A sandwich structure defined in claim 17 the segments of said chevron structure are spaced from one another but are connected by means of the skins of said sandwich structure to which they are bonded.

References Cited by the Examiner

UNITED STATES PATENTS

| | | | |
|---|---|---|---|
| 98,072 | 12/1869 | Knapp | 29—412 |
| 1,875,188 | 8/1932 | Williams | 52—618 |
| 1,982,404 | 11/1934 | Stoner | 29—412 |
| 2,858,247 | 10/1958 | De Swart | 52—618 |
| 3,151,712 | 10/1964 | Jackson | 52—615 |
| 3,209,507 | 10/1965 | Dresser et al. | 52—615 |
| 3,217,845 | 11/1965 | Reynolds et al. | 52—615 X |

FOREIGN PATENTS

| | | |
|---|---|---|
| 450,524 | 4/1935 | Great Britain. |
| 76,110 | 10/1954 | Holland. |

FRANK L. ABBOTT, *Primary Examiner.*

RICHARD W. COOKE, JR., *Examiner.*

UNITED STATES PATENT OFFICE
CERTIFICATE OF CORRECTION

Patent No. 3,313,080                          April 11, 1967

Lucien-Victor Gewiss

It is hereby certified that error appears in the above numbered patent requiring correction and that the said Letters Patent should read as corrected below.

Column 1, line 27, for "rigid" read -- ridge --; line 52, for "material," read -- material. --; line 60, for "exmple" read -- example --; column 2, line 22, for "215,519" read -- 215,591 --; line 53, for "preesnt" read -- present --; column 5, line 38, after "inside" insert -- side --; line 49, for "whoses" read -- whose --; lines 52 and 53, for "opening" read -- openings --.

Signed and sealed this 7th day of November 1967.

(SEAL)
Attest:

Edward M. Fletcher, Jr.

Attesting Officer

EDWARD J. BRENNER

Commissioner of Patents